Patented Jan. 11, 1938

2,104,793

UNITED STATES PATENT OFFICE 2,104,793

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application March 5, 1937, Serial No. 129,223

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated in the present process is obtained by the mild oxidation of a chemical compound by means of a gaseous oxygen containing medium. The compound is of the kind which is characterized by the presence of a polybasic carboxy acid residue and an oxygen-convertible fatty acid residue, and also by the presence of either a polyhydric alcohol residue or a non-oxygen-convertible fatty acid residue, or both.

Various polybasic carboxy acids or their anhydrides, such as phthalic acid, maleic acid, succinic acid, oxalic acid, etc., have been combined with hydroxylated fatty acids or salts or esters thereof to produce demulsifying agents, for instance, ricinoleic acid, triricinolein, hydroxystearic acid, hydroxystearin, etc., may be treated with phthalic acid or the like to produce a compound in which there is both a fatty acid residue and a dibasic carboxy acid residue. In such instances, where a glyceride is employed (or a comparable compound derived from a glycol, such as ethylene glycol or diethylene glycol), there is also present a polyhydric alcohol residue. The expression "polyhydric alcohol residue" is used in its broadest sense to include polyhydric alcohol ethers, as well as polyhydric alcohols, and thus includes diethylene glycol as well as ethylene glycol and diglycerol, as well as glycerol. If triricinolein or ricinoleic acid or diricinoleic acid is phthalated, then the free carboxylic hydrogen may be combined with a molecule of a polyhydric alcohol, such as ethylene glycol or glycerol. Similarly, if two or three molecules of phthalic anhydride are introduced into a molecule of triricinolein, then one can introduce more than one additional glycerol or glycol residue to combine with the free carboxylic hydrogen atoms.

However, such or similar compounds are also obtainable in other ways, as for instance, by acylation of the residual hydroxyl of the polyhydric alcohol, in material derived from non-hydroxylated fatty acids such as mono-olein, di-olein, monostearin, distearin, monopalmitin, dipalmitin, monolinolin, dilinolin, monolinolenin, dilinolenin, monoclupanodonin, diclupanodonin, mono-erucin, and di-erucin, all of which are esters of various higher fatty acids. In any instance, instead of employing a single fatty acid, one may employ mixtures, and particularly mixtures derived from naturally-occurring fats or oils, such as the mixed fatty acids from tallow, olive seed oil, palm oil, cocoanut oil, corn oil, peanut oil; various drying oils, such as linseed oil, perilla oil; and various semi-drying oils, also from various marine oils, such as menhaden oil, codliver oil, etc.

In any event, the monoglyceride or the diglyceride or the equivalent ester derived from a glycol, is treated with a polybasic acid or its anhydride, such as phthalic acid, so as to combine with a residual hydroxyl of the polyhydric alcohol residue. For instance, mono-olein may be treated with phthalic anhydride or with oxalic acid.

If materials of the kind described above are prepared so that the chemical compound containing a fatty acid residue and a polybasic carboxy acid residue contains at least one oxygen-convertible fatty acid residue, either alone or in addition to some other fatty acid residue which may not be oxygen-convertible, and if such a compound is subjected to mild oxidation, I have found that the resulting material so obtained is valuable as a demulsifying agent.

Certain vegetable oils containing a greater or lesser proportion of linolic acid, linolenic acid, or the like in combined form, are known as drying oils. The vegetable drying oils include, among others, perilla oil, linseed oil, tung oil, poppyseed oil, etc. Candlenut oil, walnut oil, soy bean oil, nigerseed oil, and sunflower oil are also considered as vegetable drying oil. Semi-drying vegetable oils include corn oil, cottonseed oil, kapok oil, sesame oil, and other similar oils. Other drying or semi-drying oils include rubberseed, safflower, etc.

In some instances, it is a matter of arbitrary difference whether to consider vegetable oil as a drying oil or as a semi-drying oil. In addition to the drying vegetable oils, there is a large number of marine oils, characterized by the fact that they contain an appreciable amount of clupanodonic acid in combined form. Such materials include menhaden oil, Japan fish oil, cod-liver oil, whale blubber oil, seal oil, herring oil, and a number of similar oils.

Oils of the kind described above are known as oxygen-convertible. In other words, when spread out in a thin layer and subjected to air oxidation at relatively low temperature, for instance, below the boiling point of water, they readily form a film. Common paints made with linseed oil are an example of this property. It happens that some of the fish oils will form a solid film under conditions similar to the film formation in the case of linseed oil, but that such films do not have the characteristic properties desirable in the paint and therefore these marine oils find limited application in paint manufacture. I employ the expression "oxygen-convertible" to refer to these oils, and I am using the expression "oxygen-convertible" to refer to the mixed fatty acids derived from these oils, or to separated fatty acids such as linolic acid, linolenic acid, clupanodonic acid, etc. The expression "oxygen-convertible" has been used previously in this same sense. These oxygen-convertible oils or fatty acids, as previously indicated, may be subjected to mild oxidation and so changed that the iodine value is materially lowered or completely eliminated, and usually along with a simultaneous increase in viscosity.

It is to be noted that the conditions of oxidation are entirely different from the conditions employed in producing blown oils from some of these materials. For instance, the marine oils may be heated to a temperature of approximately 175-350° C. and subjected to oxidation, so as to not only lower the iodine number, but also so as to produce various more complex changes. In fact, in some such instances, possibly decomposition takes place along with the formation of acids of smaller molecular weight, or with the formation of dibasic acids or ketonic or aldehydic acids. The expression "mild oxidation" as herein employed is used to mean conditions comparable to film formation under atmospheric oxidation, although obviously for reasons herein pointed out, it is more desirable to produce rapid oxidation by subjecting materials to a temperature of approximately 50-85° C. and to force air or oxygen through the mass. However, such reaction is always conducted in such a manner so as to insure mild oxidation. The mild oxidation is designed and conducted for the purpose of producing reactions of the ordinary drying type. I have found that if one combines mono-linolin or di-linolin with a dibasic acid, such as phthalic acid, and then subjects the mass to mild oxidation of the kind described above, one obtains a more valuable demulsifying agent than the original unoxidized compound. Similarly, one may employ the mono- or diglyceride derived from linseed oil, perilla oil, sunflower oil, or various other oxygen-convertible oils or glycerides mentioned above.

However, one may produce similar or related compounds by other methods. For instance, monoricinolein or diricinolein, monohydroxy-stearin or dihydroxystearin may be esterified with an additional molecule or molecules of linolic acid, linolenic acid, or the like, so as to yield a mixed glyceride in which there is present at least one oxygen-convertible fatty acid residue. Such material may be treated with a dibasic carboxy acid, such as phthalic acid, which will combine by virtue of the ricinoleic acid residue or residues present in the molecule. If desired, the free carboxylic hydrogen of such compound may be further combined with one or more molecules of a polyhydric alcohol such as glycerol or ethylene glycol. Similarly, triricinolein may be combined with one or more molecules of phthalic anhydride. Such mono-phthalated triricinolein or di-phthalated triricinolein or tri-phthalated triricinolein may be combined with one, two, or three molecules of a polyhydric alcohol, such as ethylene glycol or glycerol. One or more of the free hydroxyls of the glycerol residue or residues in such a compound may then be combined with an oxygen-convertible fatty acid, such as linolic acid or linolenic acid, or mixtures of the same, or the mixed fatty acids derived from oxygen-convertible oils, as described above. Dihydroxy-stearic acid may be esterified by virtue of the alcoholic hydroxyls with one molecule of linolic acid or linolenic acid, and with one molecule of phthalic acid, maleic acid, or oxalic acid, so as to give a suitable compound.

In any event, one may use procedures of the kind described above, or any other suitable procedure to produce a chemical compound characterized by the presence of a polybasic carboxy acid residue and an oxygen-convertible fatty acid residue, and either a polyhydric alcohol residue or a non-oxygen-convertible fatty acid residue, or both.

In the manufacture of the reagents above described, the polybasic carboxy acids employed include the following: those of the aromatic type, alkyl type, aralkyl type, cyclic type, heterocyclic type, etc. Suitable examples, including those previously pointed out, are succinic, maleic, malic, aconitic, tartaric, citric, fumaric, oxalic, tricarballylic, trihydroxy-glutaric, mesoxalic, phthalic, diphenic, naphthalic, benzoyl-benzoic, trimesic, mellitic, cinchomaronic, quinolinic, camphoric, aspartic, norpinic, glutamic, etc. In addition, the polyhydroxy phenols, which are amphoteric in nature, such as catechol, resorcinol, quinol, pyrogallol, hexahydrophenol, etc., may be employed as and are equivalent to polybasic carboxy acids when caused to react with more basic substances or are equivalent to polyhydric alcohols when caused to react with more acidic substances than themselves.

Various polyhydric alcohols may be employed. They may be aliphatic, aromatic, cyclic, aralkyl, heterocyclic, etc. Suitable polyhydric alcohols include ethylene glycol, glycerol, erythritol, adonitol, mannitol, dihydroxy-naphthalene, alizarin, purpurin, terpin, dihydroxy-thiophene, ethyl trihydroxy-palmitate, ethyl trihydroxy-chlorpalmitate, etc.

One may employ the acids or alcohols themselves or their derivatives, such as halogen derivatives, etc., provided that the materials still exhibit the desired acidic or basic character. For the sake of simplicity, I prefer to designate polyhydric alcohols and their derivatives and polybasic acids and their derivatives, of the kinds described, as polyhydric alcohol bodies and polybasic acid bodies, respectively.

The method of manufacture of such materials is well known and is simply a matter of esterification. Generally speaking, esterification is conducted at a temperature above the boiling point of water, and in some instances temperatures as high as 200° may be employed. It may be desirable to pass a dried inert gas through the mixture during esterification.

The chemical compound of the kind described above, that is, having present a polybasic carboxy acid residue and an oxygen-convertible fatty acid residue, and also either a polyhydric alcohol residue or a non-oxygen-convertible fatty acid residue, or both, is subjected to mild gaseous oxidation as indicated. The course of such mild oxidation is indicated by lowering the iodine number in a significant manner, or by increased viscosity, or by any other suitable method. Such mild oxidation may be conducted directly on the undissolved liquid or melted material, or on a solution of the same, particularly in the presence of some suitable solvent, especially a non-volatile solvent, such as a high boiling kerosene or the like. Oxygen or ozone, of course, could replace air as the oxidizing medium. In many instances, it is desirable to continue the oxidation until the iodine value has dropped sufficiently to be equivalent to the elimination of one ethylene linkage per molecule, or a major fraction thereof. In other instances, oxidation may eliminate the equivalent of two ethylene linkages per molecule.

In the event that the finished material contains a carboxylic hydrogen atom, it is evident that such carboxylic hydrogen atom may be replaced by any suitable organic radical or by a metal or by an ammonium radical, or a substituted ammonium radical (amine radical). For instance, such ionizable hydrogen atom may be replaced by an alkyl radical derived from a monohydric alcohol, such as methyl alcohol, ethyl alcohol, propyl alcohol, butyl alcohol, amyl alcohol, hexyl alcohol, etc. The material may be neutralized with any suitable base, such as caustic soda, caustic potash, ammonia, propanolamine, dipropanolamine, tripropanolamine, triethanolamine, diethanolamine, benzylamine, amylamine, diamylamine, triamylamine, or the like. One may likewise prepare polyvalent metallic salts, such as iron salts, copper salts, lead salts, calcium salts, magnesium salts, etc.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than an amine of the kind previously described, or the like.

My preferred reagent is prepared in the following manner:

675 pounds of commercial diricinolein is esterified with 275 pounds of linseed oil fatty acids. When esterification is complete, the product is treated with 300 pounds of phthalic anhydride, so as to yield the diphthalated mixed triglyceride. The material is then mixed with an equal volume of high boiling drain oil derived from coal tar and subjected to air oxidation at approximately 75° C. until the iodine value of the fatty acids obtained by saponification, following an acid splitback procedure, has shown a decrease equivalent to about 20 to 60 points. The theoretical iodine value of such acid split material based on the average value of linseed oil fatty acids and on the average value for ricinoleic acid, is about 120–125. The iodine value attributable to the linseed oil fatty acids alone is approximately 190–200. This later iodine value or the major fraction thereof can be eliminated by mild oxidation. The iodine value due to the ricinoleic acid cannot be readily eliminated by oxidation under the mild conditions employed. For this reason, in the preparation of my preferred reagent, I stop oxidation when the drop in iodine number as above noted is equivalent to 20 to 60 points, which represents from approximately 30 to over 90 percent of the iodine number contributed by the linseed oil fatty acids.

After completion of such oxidation, the material dissolved in or suspended in the drain oil may be used as such or the drain oil may be distilled off under vacuum, or in any other suitable manner. The preferred reagent may be neutralized if desired by the addition of a suitable amount of triethanolamine, and the material in absence of drain oil may be dissolved in any suitable solvent, such as a mixture of solvent naphtha, propyl alcohol, and kerosene. In event that the preferred reagent is neutralized with triethanolamine or in some similar manner, the solvent may include a suitable amount of water. The drain oil referred to above is comparable to a high boiling solvent naphtha, containing only minor amounts of naphthalene.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing my process, a treating agent or demulsifying agent of the kind above described is brought into contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

Having thus described my invention, what I claim as new and desire to secure by Letters Patent is:

1. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a polybasic carboxy acid residue and an oxygen-convertible fatty acid residue, and by a residue selected from the class consisting of polyhydric alcohol residues and non-oxygen-convertible fatty acid residues.

2. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a polybasic carboxy acid residue, an oxygen-convertible fatty acid residue, and a polyhydric alcohol residue.

3. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a polybasic carboxy acid residue, an oxygen-convertible fatty acid residue, and a non-oxygen-convertible fatty acid residue.

4. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a polybasic carboxy acid residue, an oxygen-convertible fatty acid residue, a polyhydric alcohol residue, and a non-oxygen-convertible fatty acid residue.

5. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a polybasic carboxy acid residue, an oxygen-convertible fatty acid residue, a glycerol residue, and a non-oxygen-convertible fatty acid residue.

6. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a dibasic carboxy acid residue, an oxygen-convertible fatty acid residue, a glycerol residue, and a non-oxygen-convertible fatty acid residue.

7. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of an aromatic dibasic carboxy acid residue, an oxygen-convertible fatty acid residue, a glycerol residue, and a non-oxygen-convertible fatty acid residue.

8. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue, a glycerol residue, and a non-oxygen-convertible fatty acid residue.

9. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue, a glycerol residue, and a ricinoleic acid residue.

10. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue derived from a typical vegetable drying oil, a glycerol residue, and a ricinoleic acid residue.

11. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue derived from linseed oil, a glycerol residue, and a ricinoleic acid residue.

12. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue derived from linseed oil, a glycerol residue, and a ricinoleic acid residue; said demulsifying agent being further characterized by being in the form of an alkylolamine salt.

13. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue derived from linseed oil, a glycerol residue, and a ricinoleic acid residue; said demulsifying agent being further characterized by being in the form of a triethanolamine salt.

14. A process for breaking petroleum emulsions of the water-in-oil type, which consists in subjecting the emulsion to the action of a demulsifying agent comprising a product obtained by a mild gaseous oxidation of a chemical compound, by means of a medium containing oxygen in chemically uncombined form; said chemical compound being characterized by the presence of a phthalic acid residue, an oxygen-convertible fatty acid residue derived from linseed oil, a glycerol residue, and a ricinoleic acid residue; said demulsifying agent being diluted with a suitable solvent.

MELVIN DE GROOTE.